US012705214B2

(12) United States Patent
Longo et al.

(10) Patent No.: US 12,705,214 B2
(45) Date of Patent: Aug. 11, 2026

(54) GROUP BASED QOS POLICIES FOR VOLUMES

(71) Applicant: NetApp, Inc., Sunnyvale, CA (US)

(72) Inventors: Austino Nicholas Longo, Lafayette, CO (US); Jared Cantwell, Boulder, CO (US); Charles Randall, Longmont, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 16/858,472

(22) Filed: Apr. 24, 2020

(65) Prior Publication Data

US 2021/0334247 A1 Oct. 28, 2021

(51) Int. Cl.

| | |
|---|---|
| ***G06F 16/21*** | (2019.01) |
| ***G06F 16/22*** | (2019.01) |
| ***G06F 16/28*** | (2019.01) |
| *G06Q 10/10* | (2023.01) |

(52) U.S. Cl.

CPC .......... *G06F 16/21* (2019.01); *G06F 16/2228* (2019.01); *G06F 16/285* (2019.01); *G06Q 10/10* (2013.01)

(58) Field of Classification Search

CPC ........................................................ G06F 16/21

USPC .......................................................... 707/661

See application file for complete search history.

(56) References Cited

U.S. PATENT DOCUMENTS

| | | | | |
|---|---|---|---|---|
| 7,934,060 | B1 * | 4/2011 | Corbett | G06F 12/0815 711/141 |
| 10,846,137 | B2 * | 11/2020 | Vallala | G06F 9/455 |
| 10,997,098 | B2 | 5/2021 | Longo et al. | |
| 11,005,924 | B1 | 5/2021 | Cady et al. | |
| 11,140,219 | B1 | 10/2021 | Cady | |
| 2007/0064604 | A1 | 3/2007 | Chen et al. | |
| 2007/0067366 | A1 * | 3/2007 | Landis | G06F 12/1009 |
| 2007/0083482 | A1 | 4/2007 | Rathi et al. | |

(Continued)

OTHER PUBLICATIONS

International Search Report and Written Opinion for International Application No. PCT/US2021/017473 dated Jun. 7, 2021, 9 pages.

(Continued)

*Primary Examiner* — Syling Yen

(74) *Attorney, Agent, or Firm* — Jaffery Watson Hamilton & DeSanctis LLP

(57) ABSTRACT

A technique provides efficient management of policies for objects of a distributed storage architecture configured to service storage requests issued by one or more clients of a storage cluster. The objects may include volumes for storing data served by storage nodes of the cluster and the policies may include quality of service (QoS) policies. The technique enables dynamic grouping of the volumes as management domains and applying attributes, such as performance settings of the QoS policies, to the management domains. A group of volumes may be organized as a management domain and a QoS policy may be applied to the domain. If membership of the management domain is modified, the QoS policy is automatically applied to the added volume or stripped from the removed volume. If a performance setting of the policy is modified, the modification is atomically applied and propagated to each volume of the management domain.

21 Claims, 7 Drawing Sheets

(56) References Cited

U.S. PATENT DOCUMENTS

| | | | | |
|---|---|---|---|---|
| 2009/0276771 | A1* | 11/2009 | Nickolov | G06Q 30/04 718/1 |
| 2012/0150802 | A1* | 6/2012 | Popov | G06F 11/2094 707/635 |
| 2013/0227111 | A1 | 8/2013 | Wright et al. | |
| 2013/0232261 | A1 | 9/2013 | Wright et al. | |
| 2017/0083251 | A1* | 3/2017 | Karale | G06F 3/067 |
| 2017/0222935 | A1 | 8/2017 | Kalman et al. | |
| 2017/0315728 | A1* | 11/2017 | Zheng | G06F 3/0604 |
| 2017/0317895 | A1 | 11/2017 | Wright et al. | |
| 2018/0081832 | A1 | 3/2018 | Longo et al. | |
| 2019/0171438 | A1* | 6/2019 | Franchitti | G06F 16/9538 |
| 2021/0160155 | A1 | 5/2021 | Wright et al. | |
| 2022/0342556 | A1 | 10/2022 | Dimnaku et al. | |

OTHER PUBLICATIONS

Baker R., "SolidFire, vVols, and QoS Noisy Neighbor Issues," Baker's Cloudy World, 2019, 17 pages. URL : https://ryanbaker.io/2019-09-03-solidfire-and-vvols/.

Bigelow S.J., "Definition Microsoft Storage QoS (Storage Quality of Service)," TechTarget Network, 2022, 5 pages. URL: https://www.techtarget.com/searchwindowsserver/definition/Microsoft-Storage-QoS-Storage-Quality-of-Service#:~:text=Microsoft%20Storage%20QoS%20(Storage%20Quality%20of%20Service)%20is%20a%20feature,Cluster%20Shared%20Volumes%20(CSV).

Crump G., "What Is Storage QoS?," Network Computing, 2014, 6 pages. URL: https://www.networkcomputing.com/data-centers/what-storage-qos.

NetApp., "Guarantee throughput with QoS," ONTAP 9, 2022, pp. 1-17. URL: https://docs.netapp.com/us-en/ontap/performance-admin/guarantee-throughput-qos-task.html.

NetApp., "ONTAP 9 Documentation," ONTAP 9, 2022, pp. 1-2905. URL: https://docs.netapp.com/us-en/ontap/index.html.

NetApp., "Storage QoS," Data ONTAP 8.2, 2014, 1 page. URL: https://library.netapp.com/ecmdocs/ECMP1552961/html/GUID-868E65B9-B84D-4191-A69D-17F0E0D8914C.html.

NetApp., "What is Adaptive QoS and how does it work?," 2022, pp. 1-5. URL: https://kb.netapp.com/Advice_and_Troubleshooting/Data_Storage_Software/ONTAP_OS/What_is_Adaptive_QoS_and_how_does_it_work.

NetApp., " Concept of HCI Performance," NetApp HCI Documentation, 2022, pp. 1, URL: https://docs.netapp.com/us-en/hci/docs/concept_hci_performance.html.

Sammer, "NetApp SolidFire Quality of Service (QoS)", Technical Report, Oct. 2017, 20 pages, NetApp, Inc. URL: https://www.netapp.com/pdf.html?item=/media/10502-tr-4644.pdf.

* cited by examiner

GROUP BASED QOS POLICIES FOR VOLUMES

BACKGROUND

Technical Field

The present disclosure relates to management of policies applied to objects used to serve data stored on storage devices of a storage cluster and, more specifically, to managing quality of service (QoS) policies applied to volumes of the storage cluster.

Background Information

A plurality of storage nodes organized as a storage cluster may provide a distributed storage architecture configured to service storage requests issued by one or more clients of the storage cluster. The storage requests may include input/output (I/O) operations for data stored on storage units coupled to one or more of the storage nodes. The data served by the storage nodes may be distributed across the storage units embodied as persistent storage devices, such as hard disk drives, flash memory systems, or solid-state drives. The storage nodes may logically organize the data stored on the storage devices as volumes. The I/O operations include read and write operations, the performance of which may vary across storage devices. A unit of measurement commonly used to characterize performance, such as the number of read and write operations to storage locations of the volumes, is input/output operations per second (IOPS).

Quality of service (QoS) policies are often available for various performance levels, each of which may specify defined performance settings of a policy. Typically, a client (e.g., a user) selects the QoS policy for an individual volume at a time. However, when managing large numbers of volumes, changing a performance setting of the QoS policy may require that each volume associated with the specified performance level has its respective policy changed, which may be time consuming and burdensome.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
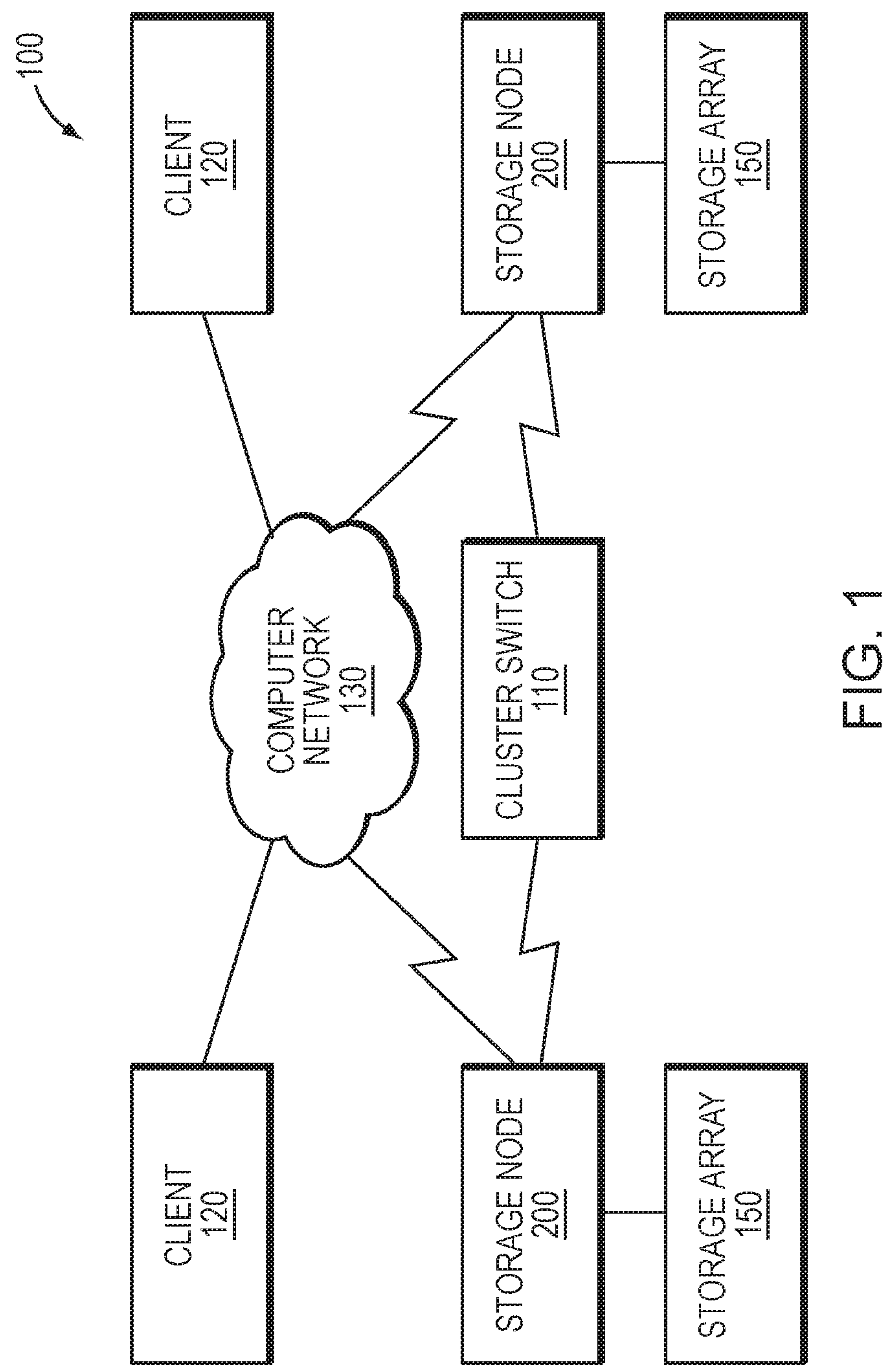
FIG. 1 is a block diagram of a plurality of storage nodes interconnected as a storage cluster.

The embodiments described herein are directed to a technique for providing efficient management of policies across objects of a distributed storage architecture configured to service storage requests issued by one or more clients of a storage cluster. The objects may include volumes for storing data served by storage nodes of the cluster and the policies may include quality of service (QoS) policies. The technique enables dynamic grouping of the volumes as one or more management domains and applying attributes, such as performance metrics or settings of the QoS policies, to the management domains. That is, a group of volumes may be organized as a management domain with a QoS policy applied (i.e., linked) to the domain. Subsequently, if membership of the management domain changes (i.e., is modified) by, e.g., adding and/or removing a volume from the group, the QoS policy is automatically applied to the added volume or stripped (eliminated) from the removed volume. Similarly, if a performance setting of the policy is modified, the modification is automatically applied and atomically propagated to each volume of the management domain such that the policy applies to all the objects of the domain as whole.

In an embodiment, the management domain may be implemented as an abstraction layer within a database of the storage cluster to provide a level of indirection that enables efficient and reliable group-based policy application across the volumes (e.g., objects) in the distributed storage architecture. Configuration information of the database may be embodied as various data structures and associated entries or fields of the objects, which structures/fields are organized as a view or namespace of the objects from the perspective of a client. A database service constructs the namespace to facilitate management of the objects on the storage cluster and employs the management domain to provide, transparent to the client, the level of indirection for the client accessing the objects. Upon detecting a change to contents of the data structure fields, the database service synchronously invokes one or more callback functions to propagate the changes to appropriate data structures and reset appropriate fields of those structures to affect the automatic and atomic application of the changes/modifications.

Advantageously, the level of indirection provided by the grouping of objects as a management domain allows the objects to be dynamically added and/or removed from the group and, in response, attributes linked to the group (management domain) are automatically applied to the added objects and stripped from the removed objects. In addition, the level of indirection allows changes to the attributes associated with management domain as a whole to be atomically applied and propagated to each object of the management domain. Notably, the level of indirection results in substantial flexibility when managing attributes across the objects by obviating a static link between the objects and the attributes, thereby reducing the time consuming and burdensome requirement on the client to individually manage attribute changes to the objects. That is, the attributes are maintained globally as part of the management domain, but are applied locally to each object (e.g., volume) within the domain as the attributes change (e.g., as attributes are added, removed, or modified) and applied to objects that are added or removed from the domain. In this manner, attributes of the management domain are applied to the volumes for enforcement so that a QoS implementation is retained at the volume level (e.g., at a level of service of a volume), so as to permit effective scale-out of nodes and volumes for the cluster with distributed QoS enforcement.

DESCRIPTION

Storage Cluster

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to an external storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the storage node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage resources or objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over Fibre Channel (FCP), when accessing information in the form of objects such as logical units (LUNs).

Figure 2:
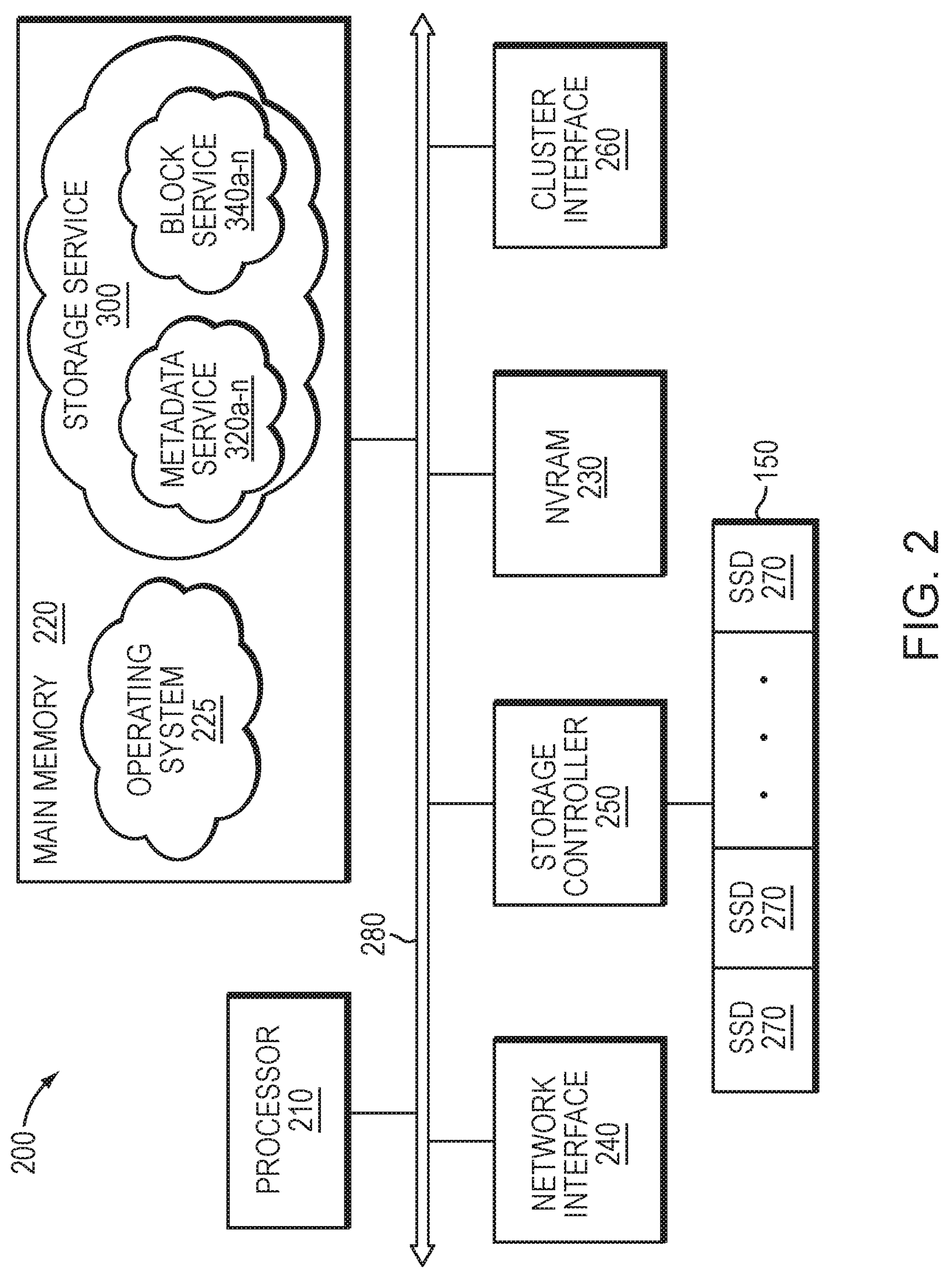
FIG. 2 is a block diagram of a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 280. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as one or more metadata services 320_a-n_ and block services 340_a-n_ of storage service 300, and manipulate the data structures. An operating system 225, portions of which are typically resident in memory 220 and executed by the processing elements (e.g., processor 210), functionally organizes the node by, inter alia, invoking operations in support of the storage service implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein. Also, while the embodiments herein are described in terms of software programs, services, code, processes, and computer, e.g., applications stored in memory, alternative embodiments also include the code, services, processes and programs being embodied as logic and/or modules consisting of hardware, software, firmware, or combinations thereof.

The storage controller 250 cooperates with the storage service 300 implemented on the storage node 200 to access information requested by the client 120. The information is preferably stored on storage devices, such as internal solid-state drives (SSDs) 270, illustratively embodied as flash storage devices, as well as SSDs of external storage array 150 (e.g., an additional storage array attached to the node). In an embodiment, the flash storage devices may be block-oriented devices (e.g., drives accessed as blocks) based on NAND flash components, e.g., single-level-cell (SLC) flash, multi-level cell (MLC) flash, triple-level cell (TLC) flash, or quad-level cell (QLC) flash and the like, although it will be understood to those skilled in the art that other block-oriented, non-volatile, solid-state electronic devices (e.g., drives based on storage class memory components) or magnetic storage devices (e.g., hard drives with rotating media) may be advantageously used with the embodiments described herein. The storage controller 250 may include one or more ports having input/output (I/O) interface circuitry that couples to the SSDs 270 over an I/O interconnect arrangement, such as a serial attached SCSI (SAS), serial ATA (SATA), and non-volatile memory express (NVMe) PCI topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3A:
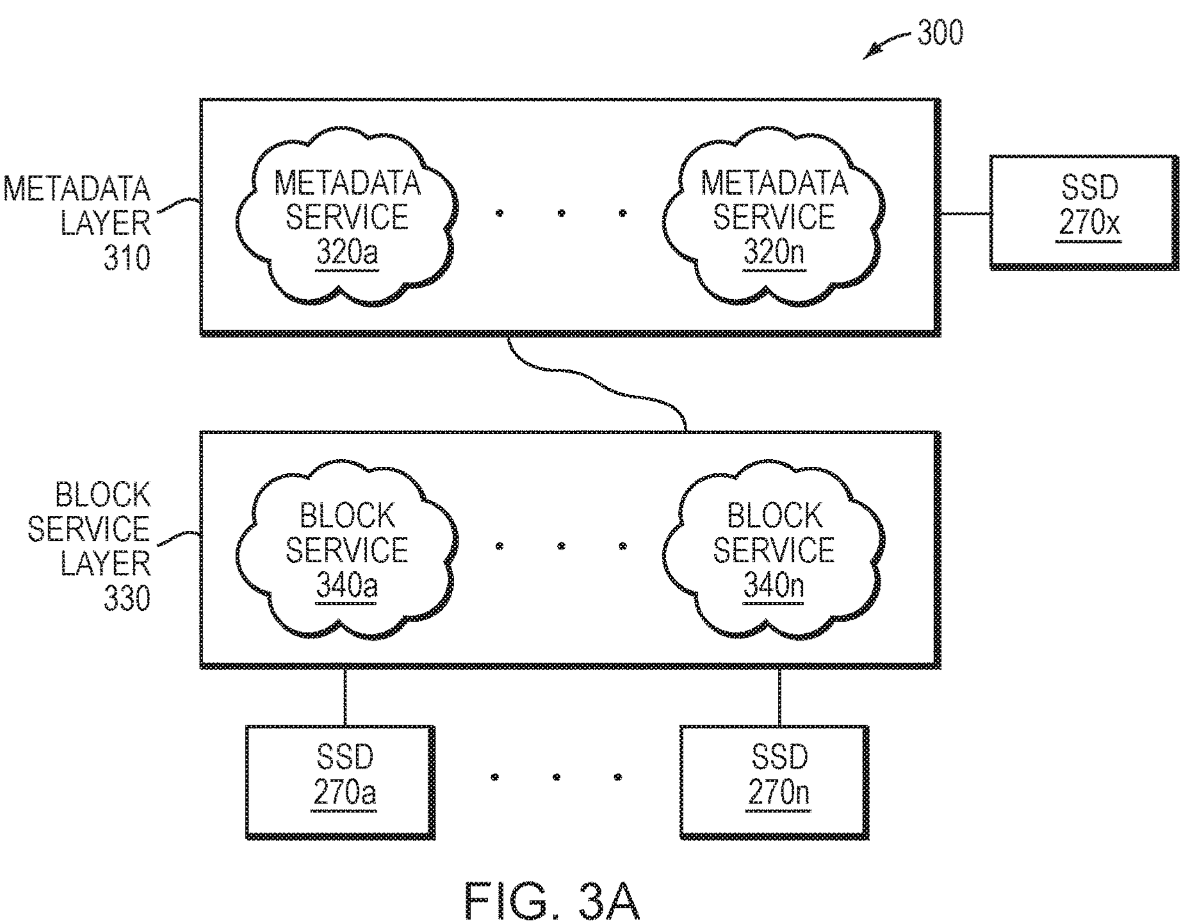
FIG. 3A is a block diagram of a storage service of the storage node.

FIG. 3A is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, e.g., all storage, including internal SSDs 270 and external storage arrays 150 of the nodes 200 for the entire cluster 100. In other words, the architecture consolidates storage throughout the cluster to enable storage of the LUNs, each of which may be apportioned into one or more logical objects, such as volumes ("volumes"), having a logical block size of either 4096 bytes (4 KB) or 512 bytes. Each volume may be further configured with properties such as size (storage capacity)

and performance settings (quality of service), as well as access control, and may be thereafter accessible (e.g., exported) as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as I/O requests, e.g., storage requests, to access data of a volume served by a storage node 200, wherein a storage request may include data for storage on the volume (e.g., a write request) or data for retrieval from the volume (e.g., a read request), as well as client addressing in the form of a logical block address (LBA) or index into the volume based on the logical block size of the volume and a length. The client addressing may be embodied as metadata, which is separated from data within the distributed storage architecture, such that each node in the cluster may store the metadata and data on different storage devices (e.g., data on SSDs 270*a-n* and metadata on SSD 270*x*) of the storage coupled to the node. To that end, the storage service 300 implemented in each node 200 includes a metadata layer 310 having one or more metadata services 320*a-n* configured to process and store the metadata, e.g., on SSD 270*x*, and a block server layer 330 having one or more block services 340*a-n* configured to process and store the data, e.g., on the SSDs 270*a-n*. For example, the metadata services 320*a-n* map between client addressing (e.g., LBA indexes) used by the clients to access the data on a volume and block addressing (e.g., block identifiers) used by the block services 340*a-n* to store and/or retrieve the data on the volume, e.g., of the SSDs.

Figure 3B:
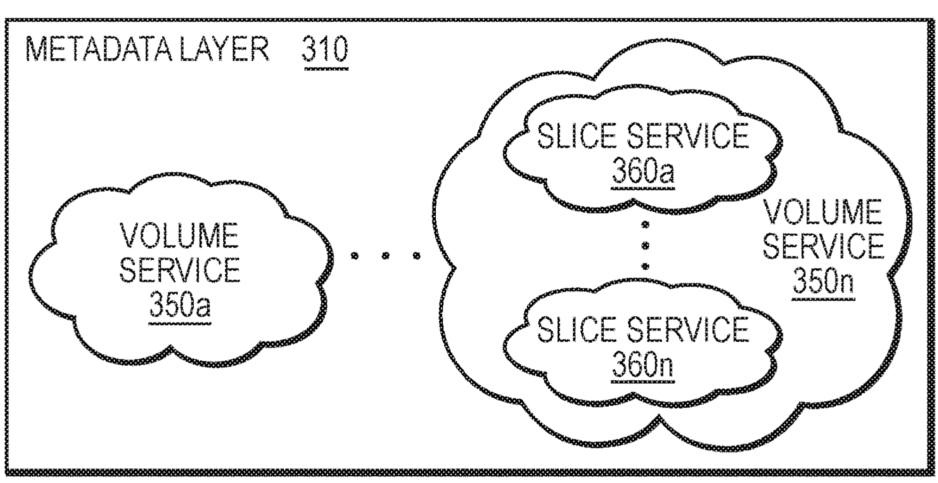
FIG. 3B is a block diagram of an exemplary embodiment of the storage service.

FIG. 3B is a block diagram of an alternative embodiment of the storage service 300. When issuing storage requests to the storage nodes, clients 120 typically connect to volumes (e.g., via indexes or LBAs) exported by the nodes. To provide an efficient implementation, the metadata layer 310 may be alternatively organized as one or more volume services 350*a-n*, wherein each volume service 350 may perform the functions of a metadata service 320 but at the granularity of a volume, e.g., process and store the metadata for the volume. However, the metadata for the volume may be too large for a single volume service 350 to process and store; accordingly, multiple slice services 360*a-n* may be associated with each volume service 350. The metadata for the volume may thus be divided into slices and a slice of metadata may be stored and processed on each slice service 360. In response to a storage request for a volume, a volume service 350 determines which slice service 360*a-n* contains the metadata for that volume and forwards the request to the appropriate slice service 360.

Figure 4:
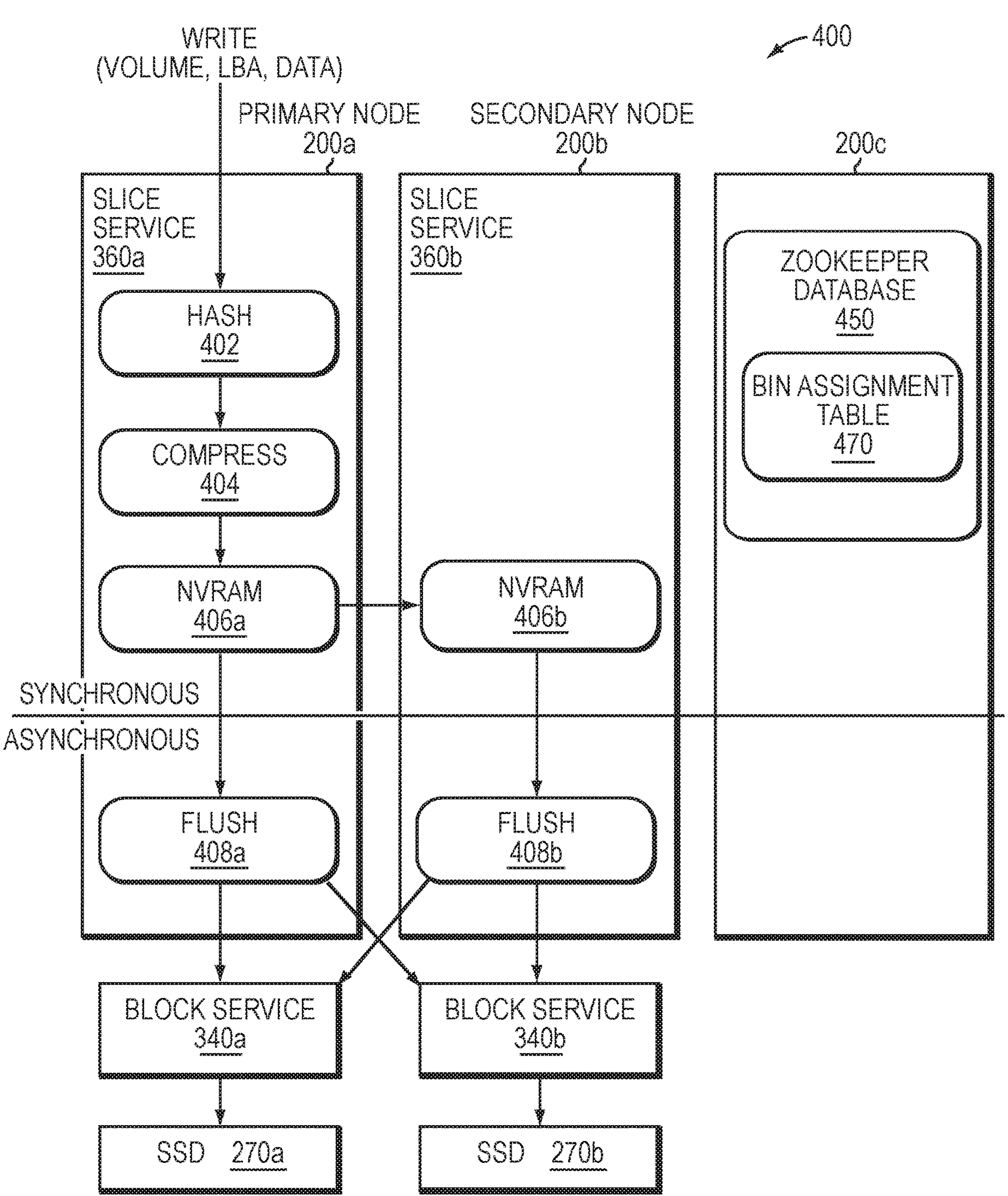
FIG. 4 illustrates a write path of the storage node.

FIG. 4 illustrates a write path 400 of a storage node 200 for storing data on a volume of storage. In an embodiment, an exemplary write request issued by a client 120 and received at a storage node 200 (e.g., primary node 200*a*) of the cluster 100 may have the following form:

write (volume, LBA, data)

wherein the volume specifies the logical volume to be written, the LBA is the logical block address to be written, and the data is the actual data to be written. Illustratively, the data received by a slice service 360*a* of the primary node 200*a* is divided into 4 KB block sizes. At box 402, each 4 KB data block is hashed using a cryptographic hash function to generate a 128-bit (16 B) hash value (recorded as a block identifier of the data block); illustratively, the block ID is used to address (locate) the data on the internal SSDs 270 as well as the external storage array 150. A block ID is thus an identifier of a data block that is generated based on the content of the data block. The cryptographic hash function, e.g., Skein algorithm, provides a satisfactory random distribution of bits within the 16 B hash value/block ID employed by the technique. At box 404, the data block is compressed using a compression algorithm, e.g., LZW (Lempel-Zif-Welch) and, at box 406*a*, the compressed data block is stored in NVRAM. Note that, in an embodiment, the NVRAM 230 is embodied as a write cache. Each compressed data block is then synchronously replicated to the NVRAM 230 of one or more additional storage nodes (e.g., secondary node 200*b*) in the cluster 100 for data protection (box 406*b*). An acknowledgement is returned to the client when the data block has been safely and persistently stored in the NVRAM of the multiple storage nodes 200*a,b* of the cluster 100.

Figure 5:
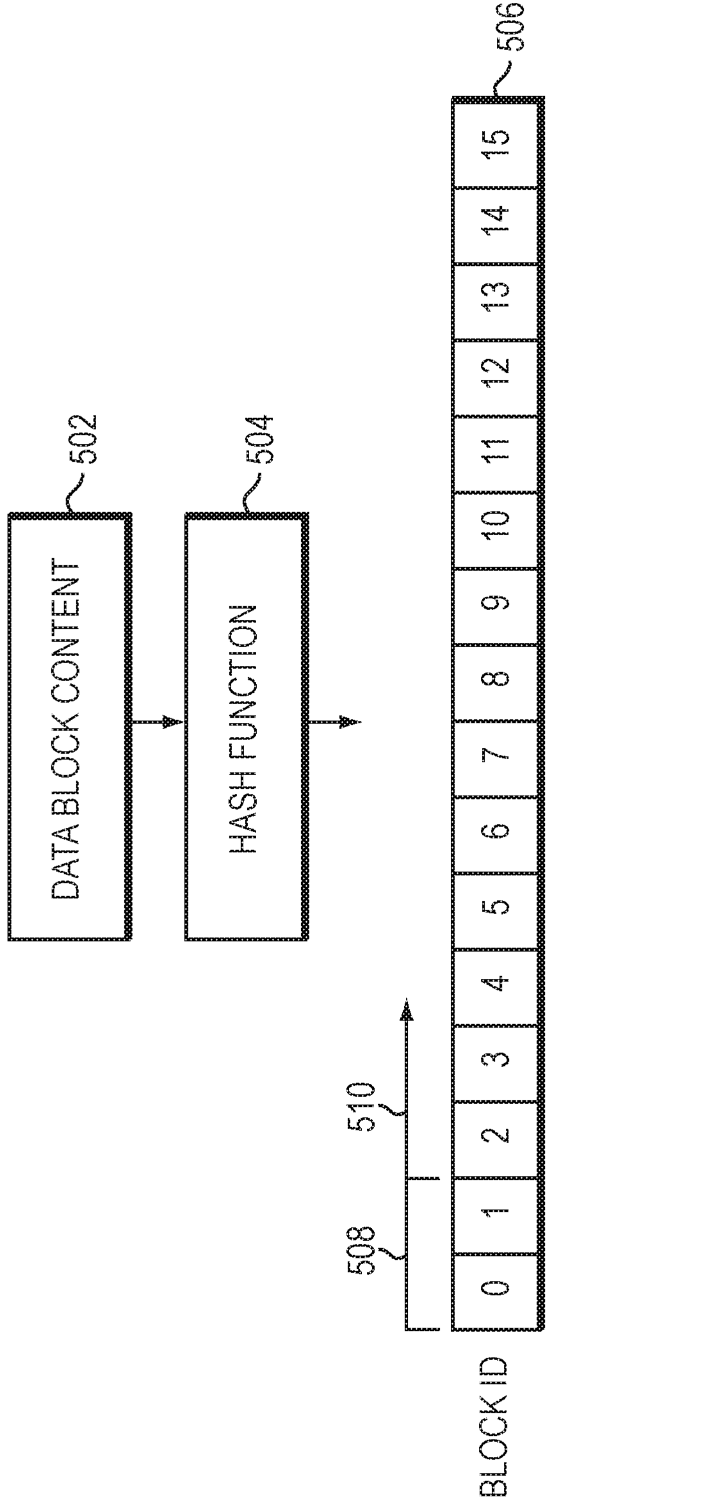
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs). That is, the data is divided into 4 KB data blocks, and each data block is hashed to generate a 16 B hash value recorded as a block ID 506 of the data block; illustratively, the block ID 506 is used to locate the data on one or more storage devices. The data is illustratively organized within bins that are maintained by a block service 340*a-n* for storage on the storage devices. A bin may be derived from the block ID for storage of a corresponding data block by extracting a predefined number of bits from the block ID 506.

In an embodiment, the bin may be divided into buckets or "sublists" by extending the predefined number of bits extracted from the block ID. For example, a bin field 508 of the block ID may contain the first two (e.g., most significant) bytes (2 B) of the block ID 506 used to generate a bin number (identifier) between 0 and 65,535 (depending on the number of 16-bits used) that identifies a bin. The bin identifier may also be used to identify a particular block service 340*a-n* and associated SSD 270. A sublist field 510 may then contain the next byte (1 B) of the block ID used to generate a sublist identifier between 0 and 255 (depending on the number of 8 bits used) that identifies a sublist with the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 340*a-n* maintains a mapping between the block ID and a location of the data block on its associated storage device/SSD, e.g., block service drive (BSD).

Illustratively, the block ID (hash value) may be used to distribute the data blocks among bins in an evenly balanced (distributed) arrangement according to capacity of the SSDs, wherein the balanced arrangement is based on "coupling" between the SSDs, e.g., each node/SSD shares approximately the same number of bins with any other node/SSD that is not in a same failure domain, e.g., protection domain, of the cluster. As a result, the data blocks are distributed across the nodes of the cluster based on content (e.g., content driven distribution of data blocks). This is advantageous for rebuilding data in the event of a failure (e.g., rebuilds) so that all SSDs perform approximately the same amount of work (e.g., reading/writing data) to enable fast and efficient rebuild by distributing the work equally among all the SSDs of the storage nodes of the cluster. In an embodiment, each block service maintains a mapping of block ID to data block location on storage devices (e.g., internal SSDs 270 and external storage array 150) coupled to the node.

Illustratively, bin assignments may be stored in a distributed key-value store across the cluster. Referring again to FIG. 4, the distributed key-value storage may be embodied as, e.g., a "zookeeper" database 450 configured to provide a distributed, shared-nothing (i.e., no single point of contention and failure) database used to store bin assignments (e.g., a bin assignment table) and configuration information that is consistent across all nodes of the cluster. In an embodiment, one or more nodes 200*c* has a service/process associated with the zookeeper database 450 that is configured to maintain the bin assignments (e.g., mappings) in connection with a data structure, e.g., bin assignment table 470. Illustratively the distributed zookeeper is resident on up to, e.g., five (5) selected nodes in the cluster, wherein all other nodes connect to one of the selected nodes to obtain the bin assignment information. Thus, these selected "zookeeper" nodes have replicated zookeeper database images distributed among different failure domains of nodes in the cluster so that there is no single point of failure of the zookeeper database. In other words, other nodes issue zookeeper requests to their nearest zookeeper database image (zookeeper node) to obtain current bin assignments, which may then be cached at the nodes to improve access times.

For each data block received and stored in NVRAM 230, the slice services 360*a,b* compute a corresponding bin number and consult the bin assignment table 470 to identify the SSDs 270*a,b* to which the data block is written. At boxes 408*a,b*, the slice services 360*a,b* of the nodes 200*a,b* then issue store requests to asynchronously flush copies of the compressed data block to the block services 340*a,b* associated with the identified SSDs 270*a,b*. An exemplary store request issued by each slice service 360*a,b* and received at each block service 340*a,b* may have the following form:

store (block ID, compressed data)

The block services 340*a,b* confirm receipt of the flushed data block copies to thereby assume "ownership" of the data. The block service 340*a,b* for each SSD 270*a,b* also determines if it has previously stored a copy of the data block. If not, the block service 340*a,b* stores the compressed data block associated with the block ID on the SSD 270*a,b*. Illustratively, data blocks are stored on (and retrieved from) the SSDs in accordance with write (and read) operations issued by the block services. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, e.g., there are at least two copies of data for redundancy purposes in the event of a hardware failure.

Group-Based QoS Policies

The embodiments described herein are directed to a technique for providing efficient management of policies across objects of the distributed storage architecture configured to service storage requests issued by one or more clients of the storage cluster. The objects may include volumes for storing data served by storage nodes of the cluster and the policies may include quality of service (QoS) policies. The technique enables dynamic grouping of the volumes as one or more management domains and applying attributes, such performance metrics or settings of the QoS policies, to the management domains. That is, a group of volumes may be organized as a management domain with a QoS policy applied (e.g., linked) to the domain. Subsequently, if membership of the management domain changes (e.g., is modified) by, e.g., adding and/or removing a volume from the group, the QoS policy is automatically (without administrator involvement) applied to the added volume or stripped (eliminated) from the removed volume. Similarly, if a performance setting of the policy is modified, the modification is automatically applied and atomically (indivisible and irreducible, i.e., all or nothing) propagated to each volume of the management domain such that the policy applies to all the objects of the domain as a whole.

In an embodiment, the management domain may be implemented as an abstraction layer within the zookeeper database 450 to provide a level of indirection that enables efficient and reliable group-based policy application across storage resources (e.g., objects), such as volumes, in the distributed storage architecture. As noted, the zookeeper database stores configuration information, which includes information related to the objects used by the nodes of the cluster. The configuration information may be embodied as various data structures and associated entries or fields of the objects, which structures/fields are organized as a view or "namespace" of the objects from the perspective of a client. A database service executing on the zookeeper database constructs the namespace to facilitate management of the objects on the storage cluster and employs the management domain to transparently provide the level of indirection for the client accessing the objects. Upon detecting a change to contents of the data structure fields, the database service synchronously invokes one or more callback functions to propagate the changes to appropriate data structures and reset appropriate fields of those structures to affect the automatic and atomic application of the changes/modifications.

Figure 6:
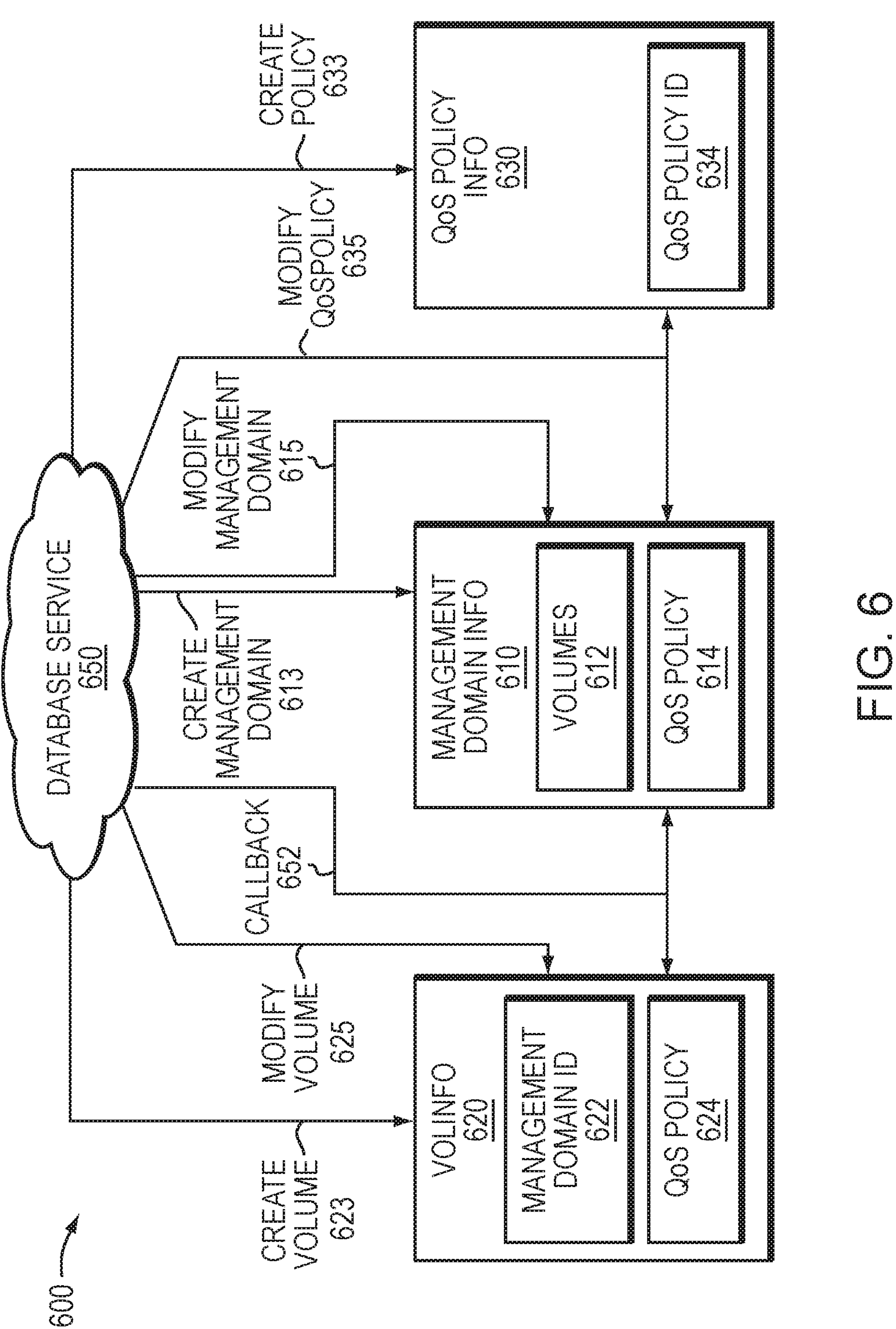
FIG. 6 is a block diagram illustrating data structures and associated entries of objects, such as volumes, organized as a namespace of a database.

FIG. 6 is a block diagram illustrating data structures and associated entries of objects, such as volumes, organized as a namespace 600 of the database 450. Implementation of the management domain and application (i.e., enforcement) of the attributes, such as QoS policy settings, applied to the domain may be performed in accordance with the various data structures (and associated entries or fields) of the namespace 600. In an embodiment, a "volume" data structure 620 (VolumeInfo) is associated with each volume (object) in the cluster 100. The VolumeInfo structure 620 includes a "management domain identifier" field 622 (ManagementDomainID) that initially defaults to a sentinel value (e.g., 0) and may be reset to a requested management domain identifier using a "modify volume" application programming interface (API) call 625 (ModifyVolume). Once the requested management domain identifier is set on a volume, a QoS policy associated with the domain may be applied to the volume by, e.g., recording (storing) the QoS policy in a policy field 624 (QoSPolicy) of the structure 620. In addition, a "QoS policy" data structure 630 (QoSPolicyInfo) is associated with each QoS policy provided by the storage cluster. As noted, QoS policies are typically available in various performance levels or tiers, each of which may specify defined performance settings of a policy. A "QoS policy identifier" field 634 (QoSPolicyID) may be set to a performance tier having performance settings related to IOPS.

A "management domain" data structure 610 (ManagementDomainInfo) is provided for each management domain (i.e., grouping of volumes) within the namespace 600. A volumes field 612 (i.e., Volumes) identifies the volumes (objects) constituting the grouping represented by the structure 610. Illustratively, the ManagementDomainInfo structure 610 is configured to record modifications of the attributes associated with a QoS policy of a management domain. To that end, a "modify management domain" API call 615 (ModifyManagementDomain) is configured to modify the associated attributes of the domain recorded in a policy field 614 (QoSPolicy) of the structure 610.

According to the technique, database service 650 employs the management domain data structure 610 to provide the level of indirection that enables reliable group-based policy application and efficient client management for objects, such as volumes, in the distributed storage architecture of the cluster. To that end, the database service 650 implements requests, such as API calls described further herein, issued by the client to create the various data structures 610-630. Moreover, the database service implements additional API calls to set (apply) and modify contents (such as attributes) of the respective fields as described further herein. In response to modifying the attributes associated with the data structures, such as the management domain structure 610, all volumes (volume data structures 620) linked to that domain have their relevant fields modified atomically (i.e., in tandem as a whole) via one or more callback functions. In this manner, attributes of the management domain are applied to the volumes for enforcement so that a QoS implementation is retained at the volume level without additional components across the cluster, so as to permit effective scale-out of nodes and volumes for the cluster.

Figure 7:
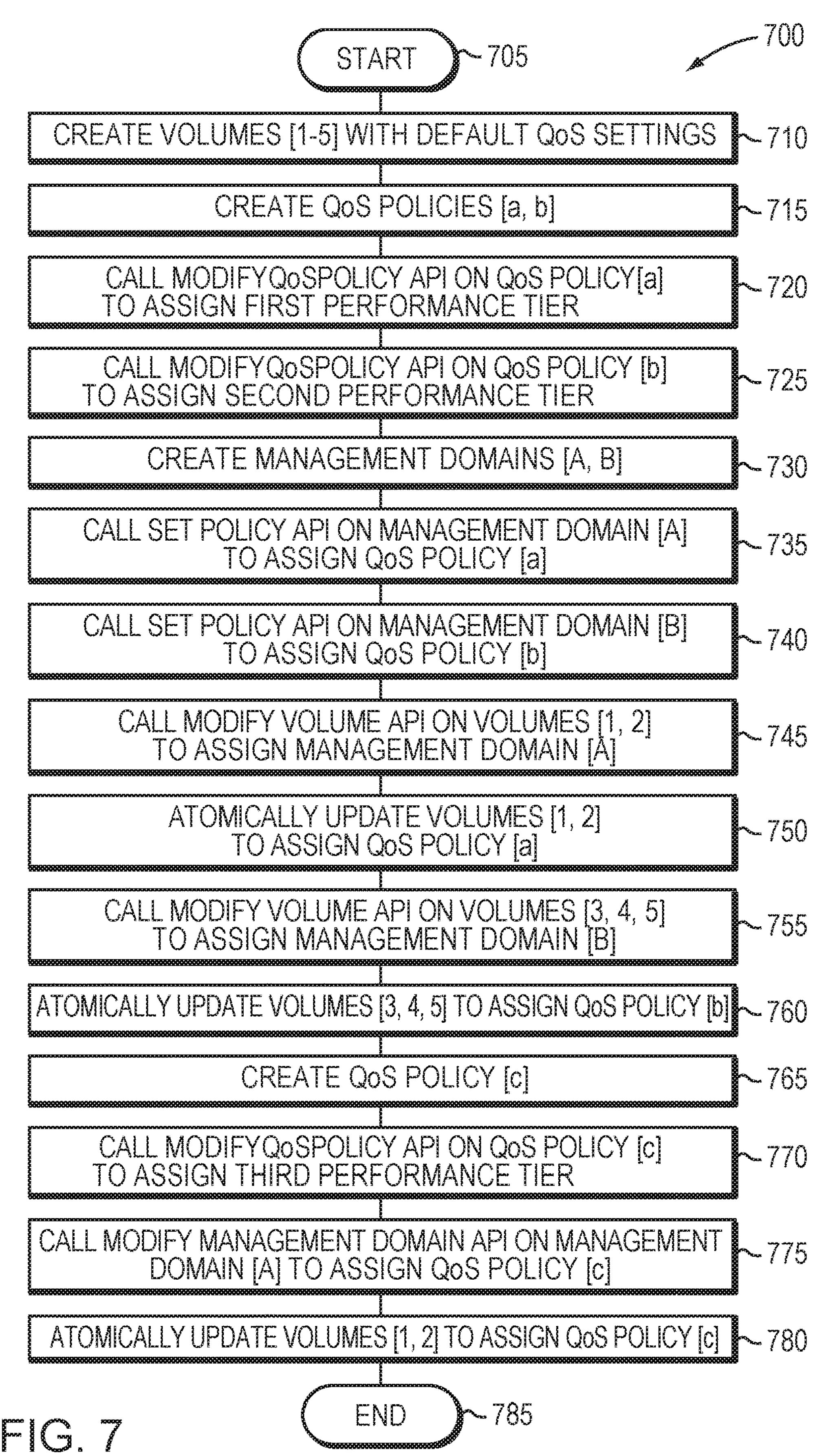
FIG. 7 is a flowchart of an example procedure for managing QoS policies for volumes of the storage cluster.

FIG. 7 is a flowchart of an example procedure 700 for managing QoS policies for volumes of the cluster. The procedure is generally directed to operations configured to create the data structures of the database namespace 600, as well as modify the contents of the entries associated with the structures, in accordance with API calls illustrated in FIG. 6. The procedure 700 starts at box 705 and proceeds to box 710 wherein a client (e.g., a user of the cluster) creates a plurality of volumes, e.g. five volumes [1-5], with default QoS settings. In an embodiment, the volumes are created in accordance with a volume creation, e.g., CreateVolume, API call 623 configured to create a node (e.g., a zookeeper znode) for each volume data structure [1-5] within the namespace of the database.

At box 715, the client creates a plurality of QoS policies, e.g., two QoS Policies [a,b], by issuing a policy creation (e.g., CreateQoSPolicy) API call 633 configured to create a node (e.g., znode) for each policy within the database namespace. At box 720, the client issues (calls) a set policy (e.g., ModifyQoSPolicy) API 635 on the QoS policy [a] and assigns the policy a first performance tier with IOPS settings of, e.g., 1000/10000/15000 (min/max/burst). At box 725, the client calls the set policy API 635 (e.g., ModifyQoSPolicy) on the QoS policy [b] and assigns that policy a second performance tier with IOPS settings of, e.g., 100/800/12000 (min/max/burst).

At box 730, the client creates a plurality of management domain structures 610 (e.g., two management domains [A,B]) by issuing a management domain creation (e.g., CreateManagementDomain) API call 613 configured to create a node for each management domain within the database. At box 735, the client calls the set policy API 635 on the management domain [A] and assigns that domain QoS Policy [a] and, at box 740, calls the set policy API 635 on the management domain [B] and assigns that domain QoS Policy [b]. Note that the assignment of QoS policies [a,b] to respective management domains [A,B] essentially links the policies to the respective domains so as to create the level of indirection in accordance with the technique described herein.

At box 745, the client calls the modify volume (e.g., ModifyVolume) API 625 on volumes [1,2] and assigns management domain [A] to the volumes. As noted, the ModifyVolume API 625 resets (modifies) the default settings of the managementDomainID field 622 of the VolumeInfo structures 620 with the management domain [A]. Before the modify volume API call returns, however, appropriate fields, e.g., QoSPolicy fields 624, of the volume data structures for volumes [1,2] are atomically updated with QoS policy [a], at box 750. Specifically, upon detecting a change to the contents of the management domain identifier field (as part of the ModifyVolume API call 625), the database service 650 synchronously invokes a callback function 652 to modify or reset the policy fields 624 of the volume data structures 620 to changed QoS settings according to the QoS policy [a]. In an embodiment, invocation of the callback function 652 atomically updates the fields 624 of the VolumeInfo structures 620 for volumes [1,2] to assign them the first performance tier IOPS settings of 1000/10000/15000 (min/max/burst), as provided by QoS Policy [a]. Moreover, invocation of the callback function 652 atomically updates the ManagementDomainInfo structure 610 for Management Domain [A] to assign Volumes [1,2] to that domain structure. Notably, the level of indirection provided by the management domain structures 610 "implicitly" links the volume data structures 620 with QoS policy data structures 630 to ensure consistency among the data structures of the database namespace 600. In this manner, a single instance of each policy need only be retained that may be applied as needed to volumes associated with the respective policy.

At box 755, the client calls the modify volume, e.g., ModifyVolume, API 625 on volumes [3,4,5] and assigns management domain [B] to the volumes. Again, the ModifyVolume API resets (modifies) the default settings of the managementDomainID field 622 of those VolumeInfo structures 620 with the management domain [B]. Before the modify volume API call returns, appropriate fields of the volume data structures 620 for volumes [3,4,5] are also atomically updated with QoS policy [b], at box 760. In an embodiment, the database service 650 synchronously invokes the callback function 652 to atomically reset and update the fields 624 of the VolumeInfo structures 620 for volumes [3,4,5] to assign them the second performance tier IOPS settings of 100/800/1200 (min/max/burst), as provided by QoS Policy [b]. In addition, the callback function 652 is invoked to atomically update the ManagementDomainInfo structure 610 for management domain [B] and assign volumes [3,4,5] to that domain structure.

At box 765, the client then creates a new QoS Policy [c] using the policy creation, e.g., CreateQoSPolicy, API call 633 and, at box 770, calls the set policy, e.g., ModifyQoSPolicy, API 635 on the QoS policy [c] and assigns the policy a third performance tier with IOPS settings of, e.g., 500/5000/7000 (min/max/burst). At box 775, the client calls the modify management domain, e.g., ModifyManagementDomain, API 615 on Management Domain [A], to modify the associated attributes of the domain recorded in the QoSPolicy field 614 and assign it QoS Policy [c]. Before the modify management domain API call 615 returns, appropriate fields 624 of the volume data structures 620 for volumes [1,2] are atomically updated with QoS policy [c], at box 780. In an embodiment, the database service 630 synchronously invokes the callback function 652 to atomically reset and update the fields 624 of the VolumeInfo structures 620 for volumes [1,2] to assign them the third performance tier IOPS settings of 500/5000/7000 (min/max/burst), as provided by QoS Policy [c]. Thus, in response to modifying the attributes associated with the management domain, all volumes linked to that domain have their relevant fields modified in tandem (e.g., atomically). In this manner, attributes of the management domain are applied to the volumes for enforcement so that the QoS implementation is retained at the volume level without additional components across the cluster, so as to permit effective scale-out of node and volumes for the cluster with distributed QoS enforcement. The procedure then ends at box 785.

While there have been shown and described illustrative embodiments for providing efficient management of policies for objects of a distributed storage architecture for a storage cluster, it is to be understood that various other adaptations and modifications may be made within the spirit and scope of the embodiments herein. For example, embodiments have been shown and described herein with relation to managing attributes, such as QoS policy settings, for volumes of the cluster using management domains of the technique described herein. However, the embodiments in their broader sense are not so limited, and may, in fact, allow for managing any attribute of a volume or storage object using the management domain. For instance, the embodiments may allow for managing storage capacity for the volumes, such that any volume included in a management domain may have its storage capacity modified (e.g., increased or decreased) using instantiations of the various data structures and API calls described herein.

Moreover, the embodiments described herein provide a generic attribute application technique that provides efficient management of attributes for any type of object (e.g., storage resource) of the distributed storage architecture using instantiations of the various data structures and API calls. For example, a logical management domain construct may be embodied as a snapshot data structure (e.g., SnapshotInfo) configured to group snapshots across (spanning) nodes, and even volumes, of the storage cluster. A client may call the modify management domain (e.g., ModifyManagementDomain) API on the management domain to modify associated attributes, such as permissions, of the snapshot group. Similarly, another management domain construct may be embodied as a network configuration data structure (e.g., NetworkInfo) configured to group network configurations across nodes of the storage cluster, and the embodiments may allow for managing attributes, such as virtual local area network (VLAN) tags, of the network configurations.

Advantageously, the management domain provides a level of indirection transparently to the client that enables efficient and reliable group-based attribute application across objects in the distributed storage architecture. For example, the level of indirection provided by the grouping of objects allows the objects to be dynamically added and/or removed from the group and, in response, attributes linked to the group (management domain) are automatically applied to the added objects and stripped from the removed objects. In addition, the level of indirection allows changes to the attributes to be atomically applied and propagated to each object of the management domain. Notably, the level of indirection results in substantial flexibility when managing attributes across the objects by obviating a static link between the objects and the attributes, thereby reducing the time consuming and burdensome requirement on the client to individually manage attribute changes to the objects. In this manner, attributes of the management domain are applied to the volumes for enforcement so that a QoS implementation is retained at the volume level (e.g., at a level of service of a volume), so as to permit effective scale-out of nodes and volumes for the cluster with distributed QoS enforcement.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

executing a service on a database of a storage cluster to implement a request issued by a client of the storage cluster to create a management domain as a data structure in a namespace of the database;

organizing, by the service, a plurality of volumes as members of the management domain, wherein the management domain is maintained as a persistent indirection object separate from metadata of the plurality of volumes and maintains attributes corresponding to the attributes of the plurality volumes including performance settings of one or more quality of service (QoS) policies;

modifying attributes of the management domain;

invoking, in response to modification of the attributes of the management domain, one or more callback functions registered with the management domain to propagate corresponding attribute changes to each volume of the plurality of volumes;

providing automatic and atomic updates to the attributes of each volume of the plurality of volumes via the invoked callback functions; and distributing enforcement of the one or more QoS policies at a level of service for the plurality of volumes independently of direct modification of per-volume metadata.

2. The method of claim 1, wherein providing automatic and atomic updates to the attributes of each volume of the management domain further comprises invoking a callback function to propagate the corresponding attribute changes to each volume of the plurality of volumes.

3. The method of claim 2, wherein invoking the callback function provides the automatic and atomic updates to the plurality of volumes.

4. The method of claim 2, further comprising executing the service on the database to invoke the callback function.

5. The method of claim 2, further comprising atomically modifying the plurality of volumes in tandem via one or more callback functions.

6. The method of claim 1, wherein each volume of the plurality of volumes is associated with a management domain identifier stored in a data structure associated with a respective volume of the plurality of volumes.

7. The method of claim 1, wherein the management domain is associated with a snapshot data structure configured to group snapshots of the plurality of volumes across the storage cluster.

8. The method of claim 1, wherein the database comprises a distributed share-nothing database across a plurality of nodes of the storage cluster.

9. The method of claim 1 further comprising in response to removing a volume from the plurality of volumes, invoking a callback function to remove the level of indirection provided by the management domain.

10. The method of claim 1, further comprising responsive to a change in membership of the management domain, atomically applying the corresponding attributes to any volumes added to the plurality of volumes as part of the change in membership and eliminating application of the corresponding attributes to any volumes removed from the plurality of volumes as part of the change in membership.

11. A system comprising:

a plurality of nodes of a storage cluster;

each node having a processor coupled to one or more storage devices, the processor executing instructions that cause the system to, execute a service on a database of the storage cluster to implement a request issued by a client of the storage cluster to create a management domain as a data structure in a namespace of the database;

organize a plurality of volumes as members of the management domain, wherein the management domain is maintained as a persistent indirection object separate from metadata of the plurality of volumes and maintains attributes corresponding to the attributes of the plurality volumes including performance settings of one or more quality of service (QoS) policies;

modify attributes of the management domain;

invoke, in response to modification of the attributes of the management domain, one or more callback functions registered with the management domain to propagate corresponding attribute changes to each volume of the plurality of volumes;

provide automatic and atomic updates to the attributes of each volume of the plurality of volumes via the invoked callback functions; and distribute enforcement of the one or more QoS policies at a level of service for the plurality of volumes independently of direct modification of per-volume metadata.

12. The system of claim 11, wherein the instructions further cause the system to invoke a callback function to propagate the corresponding attribute changes to each volume of the plurality of volumes.

13. The system of claim 12, wherein invoking the callback function provides the automatic and atomic updates to the plurality of volumes.

14. The system of claim 12, wherein the instructions further cause the system to execute the service on the database to invoke the callback function.

15. The system of claim 12, wherein the instructions further cause the system to atomically modify the plurality of volumes in tandem via one or more callback functions.

16. The system of claim 11, wherein each volume of the plurality of volumes is associated with a management domain identifier stored in a data structure associated with a respective volume of the plurality of volumes.

17. The system of claim 11, wherein the management domain is associated with a snapshot data structure configured to group snapshots of the plurality of volumes across the storage cluster.

18. The system of claim 11, wherein the instructions further cause the system to in response to removing a volume from the plurality of volumes, invoke a callback function to remove the level of indirection provided by the management domain.

19. The system of claim 11, wherein the instructions further cause the system to responsive to a change in membership of the management domain, atomically apply the corresponding attributes to any volumes added to the plurality of volumes as part of the change in membership and eliminating application of the corresponding attributes to any volumes removed from the plurality of volumes as part of the change in membership.

20. A non-transitory computer readable medium having program instructions that when executed by a processor of a storage cluster cause the storage cluster to:

execute a service on a database of the storage cluster to implement a request issued by a client of the storage cluster to create a management domain as a data structure in a namespace of the database;

organize a plurality of volumes as members of the management domain, wherein the management domain is maintained as a persistent indirection object separate from metadata of the plurality of volumes and maintains attributes corresponding to the attributes of the plurality volumes including performance settings of one or more quality of service (QoS) policies;

modify attributes of the management domain;

invoke, in response to modification of the attributes of the management domain, one or more callback functions registered with the management domain to propagate corresponding attribute changes to each volume of the plurality of volumes;

provide automatic and atomic updates to the attributes of each volume of the plurality of volumes via the invoked callback functions; and distribute enforcement of the one or more QoS policies at a level of service for the plurality of volumes independently of direct modification of per-volume metadata.

21. The non-transitory computer readable medium of claim 20, wherein the instructions further cause the storage cluster to responsive to a change in membership of the management domain, atomically apply the corresponding attributes to any volumes added to the plurality of volumes as part of the change in membership and eliminating application of the corresponding attributes to any volumes removed from the plurality of volumes as part of the change in membership.

* * * * *